United States Patent Office 3,153,010
Patented Oct. 13, 1964

3,153,010
PROCESS FOR PREPARING POLYESTER AMIDES IN THE PRESENCE OF STANNOUS OXALATE CATALYST
Lloyd T. Jenkins and Nicholas R. Congiundi, Cary, N.C., assignors, by mesne assignments, to Monsanto Company, a corporation of Delaware
No Drawing. Filed Dec. 6, 1961, Ser. No. 157,546
4 Claims. (Cl. 260—75)

This invention is addressed to the general subject matter of polyesteramide preparations. More particularly, it is concerned with an improved method for obtaining polyesteramides by poly-condensing terephthalic acid diamide-N,N'-di-ε-caproic acid or its dimethyl ester derivative with a glycol in the presence of a novel catalyst.

It is known that a superior polyesteramide can be prepared by poly-condensing terephthalic acid diamide-N,N'-di-ε-caproic acid or the dimethyl ester thereof with ethylene glycol in the presence of a poly-condensation catalyst. Catalysts which have heretofore been reported as useful in this reaction are sodium, lithium, magnesium, boron, manganese, zinc oxide, calcium oxide, lead oxide, boron oxide, sodium alcoholate, sodium carbonate, magnesium alcoholate and zinc borate (see British patent specification 747,031). Although these polyesteramides show a superiority in desirable properties over earlier polymers of this class, e.g., a greater stability with changes in temperature, a higher tensile strength, etc., previously known procedures for their preparation have not been economic and the polymers produced thereby have been greatly discolored. The latter shortcoming is particularly detrimental with respect to the use of these polymers in the fabrication of synthetic fibers for the textile industry. It has been thought that these processing disadvantages could be overcome for the most part by acquiring more efficient catalysts than those which have been known and employed heretofore.

Accordingly, it is an object of this invention to provide an improved process for poly-condensing terephthalic acid diamide-N,N'-di-ε-caproic acid or the dimethyl ester thereof with ethylene glycol.

It is a further object of this invention to provide a novel and highly efficient catalytic agent for conducting the afore-mentioned poly-condensation reaction.

It is a still further object to provide a process for preparing polyesteramides of the just described class with an improved color.

Other objects will be apparent from the description and claims which follow.

In general, these objects are accomplished by conducting the polymer forming reactions between terephthalic acid diamide-N,N'-di-ε-caproic acid or the dimethyl ester derivative thereof with ethylene glycol in the presence of a catalytic amount of stannous oxalate.

When employing the terephthalic acid diamide-N-N'-di-ε-caproic acid per se as a starting material, the polymer preparation is conducted in two stages, both in the presence of the catalytic agent, stannous oxalate. In the first stage the acid is reacted with an amount of ethylene glycol which exceeds the stoichiometric quantity to form the di-glycol ester of the acid, this monomer is then poly-condensed in the second stage reaction to form the polymer.

During the first stage in which the di-glycol ester is formed, the reaction is carried out at atmospheric pressure and at a temperature in the range of from about 175° to 195° C. and preferably between 180° and 190° C. At the completion of the first stage, the excess glycol is distilled off prior to entering the second stage of polycondensation.

The second stage, or polymerization stage, is conducted at reduced pressures. For optimum results, a pressure within the range of from 0.1 to 5 mm. of mercury is used. This reduced pressure is necessary to remove the free ethylene glycol which is formed during this stage of the reaction. The ethylene glycol is volatilized under these conditions and removed from the system. This polycondensation step is conducted at a temperature of from about 230° to 250° C., preferably between 240° and 245° C., and normally is completed in from about 10 to 30 minutes.

When employing the dimethyl ester of terephthalic acid diamide-N,N'-di-ε-caproic acid as a starting material, the procedural steps are essentially the same as outline above. In the first step, an ester-interchange reaction is conducted between ethylene glycol and the dimethyl ester of terephthalic acid diamide-N,N'-di-ε-caproic acid at normal pressures and at a temperature of from about 175° to 195° C. and preferably of between 180° and 190° C. The diglycol ester of terephthalic acid diamide-N,N'-di-ε-caproic acid is formed during this reaction together with methanol which is removed from the reaction zone.

The second, or poly-condensation stage, is conducted at reduced pressures of from about 0.1 to 5 mm. of mercury at a temperature in the range of from 230° to 250° C., and preferably from 240° to 245° C. This poly-condensation step is normally completed in from about 10 to 25 minutes.

As has been pointed out, the stannous oxalate catalyst is present in both the first and second reaction steps which have been described above. The amount of catalyst present is subject to wide variation and is not critical. There may be present merely what is known as a catalytic amount. For example, good results can be obtained with the catalyst concentration varying between 0.001 to 2.0 percent by weight based on the terephthalic acid diamide-N,N'-di-ε-caproic acid or di-ester derivative employed as a reactant.

To further illustrate the invention and the advantages thereof, the following examples are given, it being understood that they are intended to be illustrative only and not limitative. All given parts are by weight unless otherwise indicated.

*Example I*

This example illustrates the formation of a polymer from terephthalic acid diamide-N,N'-di-ε-caproic acid dimethyl ester by employing a representative catalyst of the prior practice, i.e., lead oxide.

35 parts of the dimethyl ester of terephthalic acid diamine-N-N'-di-ε-caproic acid, 17 parts of ethylene glycol and 0.2 part of yellow lead oxide were heated with stirring and in a nitrogen atomsphere to a temperature of between 190° and 200° C. for a period of about 45 minutes at which time the trans-esterification was complete. Thereafter, the pressure was slowly reduced to 0.2 mm. of mercury and the reaction temperature was raised to between 230° and 240° C. The poly-condensation was continued at these conditions for a period of four and one-half hours. The polymer recovered had a specific viscosity of 0.49 at a concentration of 0.55 gm. of polymer per 100 cc. of a solvent mixture of 60 percent by weight of phenol and 40 percent by weight of tetrachloroethane. The polymer was badly discolored.

*Example II*

This example illustrates the practice of this invention wherein terephthalic acid diamide-N,N'-di-ε-caproic acid dimethyl ester was used as a starting material.

80 parts of the dimethyl ester of terephthalic acid diamide-N,N'-di-ε-caproic acid, 39 parts of ethylene glycol and 0.16 part of stannous oxalate were heated at a temperature of from 186° to 188° C. at atmospheric pressure for 45 minutes. During this trans-esterification reaction methanol was taken off over-head. The reaction temperature was then raised to between 188° and 240° C. in order to distill off excess glycol followed by a pressure reduction with a vacuum pump. The reactants were then condensed with stirring at a temperature of from 240° to 245° C. and under 0.1 mm. of mercury. After permitting this poly-condensation reaction to run for 14 minutes, a polymer was recovered which had a specific viscosity of 0.86 at a concentration of 0.55 gm. of polymer per 100 cc. in a solvent mixture of 60 percent by weight of phenol and 40 percent by weight of tetrachloroethane. The polymer had a high molecular weight in the fiber forming range and the color characteristics were vastly improved over those of the polymer obtained in Example I.

*Example III*

This example illustrates the practice of this invention wherein terephthalic acid diamide-N,N'-di-ε-caproic acid per se was used as a starting material.

100 parts of terephthalic acid diamide-N,N'-di-ε-caproic acid, 222 parts of ethylene glycol and 0.20 part of stannous oxalate were heated at a temperature of between 180° and 185° C. at atmospheric pressure with stirring for 60 minutes. The reaction temperature was then raised to between 188° and 240° C. in order to distill off the excess glycol. The pressure was then reduced to 0.2 mm. of mercury and the temperature was maintained at a level of from 240° to 245° C. After permitting this polymerization reaction to continue for 26 minutes, a polymer was recovered which had a specific viscosity of 0.78 at a concentration of 0.55 gm. of polymer per 100 cc. of a solvent mixture consisting of 60 percent by weight of phenol and 40 percent by weight of tetrachloroethane. The color characteristics of the polymer were substantially improved when compared with the polymer obtained in Example I. Fibers were fabricated from the polymer by extruding a sample of the polymer through a conventional spinnerette. The spinning conditions employed were a melt temperature of 230° C., spinnerette temperature of 255° C. and an extrusion pressure of 215 p.s.i.g.

It is observed that in Example I where a representative catalyst of the prior art was employed in the polymer preparation, it took four and one-half hours reaction time under poly-condensation conditions to produce a polymer having a specific viscosity of 0.49 at a concentration of 0.55 gm. of polymer in a solvent mixture consisting of 60 percent by weight of phenol and 40 percent by weight of tetrachloroethane. On the other hand, in Example II where the catalyst of this invention was employed, a polymer was recovered after only 14 minutes of reaction time under similar poly-condensation conditions having a specific viscosity of 0.86, this value being determined in a manner identical to that used for the polymer of Example I. The same order of improvement over the rate of reaction in the Example I control is shown in Example III. It will also be observed that in Example I the polymer produced was badly discolored while in Examples II and III, the polymer obtained had substantially improved color characteristics.

The invention has been described in detail with particular reference to certain preferred embodiments thereof, but it will be understood that variations and modifications can be effected within the spirit and scope of the invention as described hereinabove and as defined in the appended claims.

We claim:

1. A process for preparing polyesteramides which comprises the following steps in sequence: (1) causing a compound selected from the group consisting of terephthalic acid diamide-N,N'-di-ε-caproic acid and the dimethyl ester thereof to react with a quantity of ethylene glycol in excess of the stoichiometric amount at a temperature in the range of from 175° to 195° C., (2) thereafter continuing the reaction under poly-condensation conditions of a reduced pressure of from 0.1 to 5 mm. of mercury and a temperature of from 230° to 250° C., with steps (1) and (2) being conducted in the presence of a catalytic amount of stannous oxalate.

2. A process of preparing polyesteramides which comprises the following steps in sequence: (1) causing terephthalic acid diamide-N,N'-di-ε-caproic acid to react with a quantity of ethylene glycol in excess of the stoichiometric amount at a temperature in the range of from 175° to 195° C., (2) thereafter continuing the reaction under poly-condensation conditions of a reduced pressure of from 0.1 to 5 mm. of mercury and a temperature of from 230° to 250° C., with steps (1) and (2) being conducted in the presence of from 0.001 to 2.0 weight percent of stannous oxalate based on the weight of said terephthalic acid diamide-N,N'-di-ε-caproic acid reactant.

3. A process for preparing polyesteramides which comprises the following steps in sequence: (1) causing the dimethyl ester of terephthalic acid diamide-N-N'-di-ε-caproic acid to react with a quantity of ethylene glycol in excess of the stoichiometric amount at a temperature in the range of from 175° to 195° C., (2) thereafter continuing the reaction under poly-condensation conditions of a reduced pressure of from 0.1 to 5 mm. of mercury and a temperature of from 230° to 250° C., with steps (1) and (2) being conducted in the presence of from 0.001 to 2.0 weight perecent of stannous oxalate based on the weight of said terephthalic acid diamide-N,N'-di-ε-caproic acid reactant.

4. A process for preparing polyesteramides which comprises the following steps in sequence: (1) causing a compound selected from the group consisting of terephthalic acid diamide-N,N'-di-ε-caproic acid and the dimethyl ester thereof to react with a quantity of ethylene glycol in excess of the stoichiometric amount at a temperature in the range of from 175° to 195° C., (2) thereafter continuing the reaction under poly-condensation conditions of a reduced pressure of from 0.1 to 5 mm. of mercury and a temperature of from 240° to 245° C., with steps (1) and (2) being conducted in the presence of a catalytic amount of stannous oxalate.

References Cited in the file of this patent

UNITED STATES PATENTS

| 2,719,835 | Sublett | Oct. 4, 1955 |
| 2,901,466 | Kibler et al. | Aug. 25, 1959 |
| 3,033,826 | Kibler et al. | May 8, 1962 |
| 3,055,869 | Wilson | Sept. 25, 1962 |

FOREIGN PATENTS

| 524,969 | Belgium | Dec. 31, 1953 |